United States Patent [19]

Kirk

[11] Patent Number: 4,566,031

[45] Date of Patent: Jan. 21, 1986

[54] SPATIAL LIGHT MODULATION WITH APPLICATION TO ELECTRONICALLY GENERATED HOLOGRAPHY

[75] Inventor: Ronald L. Kirk, Findlay, Ohio

[73] Assignee: The Holotronics Corporation, Findlay, Ohio

[21] Appl. No.: 580,650

[22] Filed: Feb. 16, 1984

[51] Int. Cl.$^4$ .............................................. H04N 13/00

[52] U.S. Cl. ..................................... 358/90; 358/209; 358/213; 358/236; 350/362

[58] Field of Search ................... 358/90, 2, 209, 213, 358/236; 350/3.66, 362

[56] References Cited

U.S. PATENT DOCUMENTS

| | | | |
|---|---|---|---|
| 3,201,586 | 10/1972 | Goetz | 358/90 |
| 3,506,327 | 4/1970 | Leith . | |
| 3,529,083 | 9/1970 | Nelson . | |
| 3,533,674 | 10/1970 | Brooks . | |
| 3,614,190 | 10/1971 | Haines . | |
| 3,625,584 | 12/1971 | St. John . | |
| 3,632,183 | 1/1972 | Haines . | |
| 3,639,029 | 2/1972 | Haines . | |
| 3,640,598 | 2/1972 | Neelay . | |
| 3,658,258 | 4/1972 | Hildebrand . | |

(List continued on next page.)

OTHER PUBLICATIONS

"Hologon" System Cuts Cost of Laser Scanners, Engineering News.
10,240 Pixel Focal Plane with Five Butted 2,048x96 Element TDI CCDs; Bradley et al., SPIE, vol. 175, 1979.
Terminal Puts Three-Dimensional Graphics on Solid Ground by Stover, Electronics, Jul. 28, 1981.
Real Time Holographic Interferometry.
A High Resolution Buttable Time Delay and Integrate (List continued on next page.)

Primary Examiner—Howard W. Britton
Assistant Examiner—Victor R. Kostak
Attorney, Agent, or Firm—Mueller and Smith

[57] ABSTRACT

A spatial light modulator with application to holography utilizes two planar transparent supports between which is positioned an electro-optical dipolar medium which is normally opaque but light transmissive in the presence of an applied electric field. Orthogonally disposed arrays of transparent electrodes are supported from the transparent supports and are arranged to be sequentially scanned in sampling fashion to define a sequence of uniform electric fields forming apertures of predetermined diameter. For holographic applications, one of the surfaces of the supports receives the interference pattern generated by the reference and object illumination emanating from a coherent source and the opposite support is operatively associated with a photodetecting arrangement. Through the generation of scanning synchronization signals and data signals from the photodetectors, an electronic representation of holographic data is achieved. To avoid "cross-talk" phenomena and segmented aperture definition, the assemblage includes metallic layers adjacent each of the electrode arrays having openings therein at matrix locations where the oppositely disposed electrodes cross. The metallic layers are mutually electrically coupled and serve to dissipate otherwise laterally extending field flux regions. To reconstruct these data, the same form of support and normally opaque dipolar medium is employed in conjunction with a control scanning arrangement wherein electrical fields corresponding with interference pattern intensity are provided. This arrangement may be utilized in conjunction with a reference beam of coherent light to derive a virtual image corresponding with the initially constructed holographic data. To achieve an adequate dwell interval for the reconstructed hologram for each displaced field, a latching transparent electrode layer is provided adjacent each array which is energized to produce a field therebetween having a strength below that required to initially induce a transparent condition but sufficient to maintain such condition for any pre-existing aperture. Frame rates are enhanced through register application of data signals to one entire array of electrodes while providing application to a single electrode of the oppositely disposed array.

33 Claims, 15 Drawing Figures

4,566,031

Page 2

U.S. PATENT DOCUMENTS

| | | |
|---|---|---|
| 3,715,482 | 2/1973 | Haines . |
| 3,721,312 | 3/1973 | St. John . |
| 3,746,785 | 7/1973 | Goodrich ............................ 358/90 |
| 3,879,989 | 4/1975 | Brenden . |
| 3,894,787 | 7/1975 | Leith . |
| 3,900,884 | 8/1975 | St. John . |
| 3,947,630 | 3/1976 | Javan ................................... 358/90 |
| 3,996,552 | 12/1976 | Wolber . |
| 4,484,219 | 11/1984 | Kirk ................................ 358/209 X |

OTHER PUBLICATIONS

Imaging CCD; Ibrahaim et al., 1978 International Conference on CCDs; San Diego, Cal.

Electrooptical Properties of Dipole Fluids and Their Applications to Displays by Marks, Presentation IEEE Meeting; Boston, MA 1973.

"Real-Time High-Resolvance Image Correlation by Bragg Diffraction in Saturable Absorbers", Appl. Opt., 19, 207 (1980).

"Real-Time Contour Holography Using BSO Crystals", Otp. Comm. 38, 17(1981); Kuechel and Tizione.

"Real-Time Double-Exposure Interferometry with $Bi_{12}SiO_{20}$, Crystals in Transverse Electrooptic Configuration" 1807 (1977).

"Television Transmission of Fresnel Holograms", Telecommun., Radio Eng'g. v. 32–33, 105 (1978).

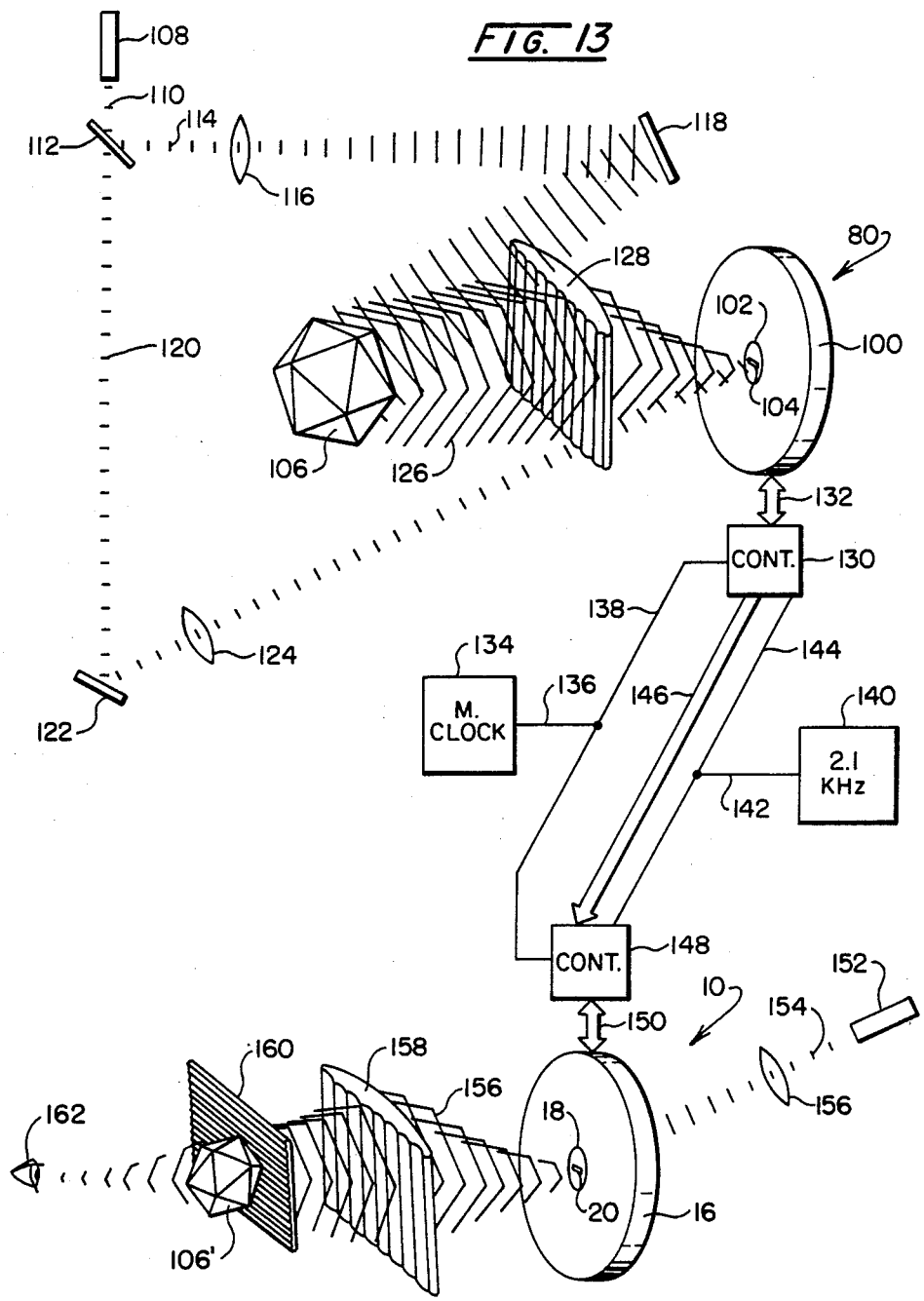

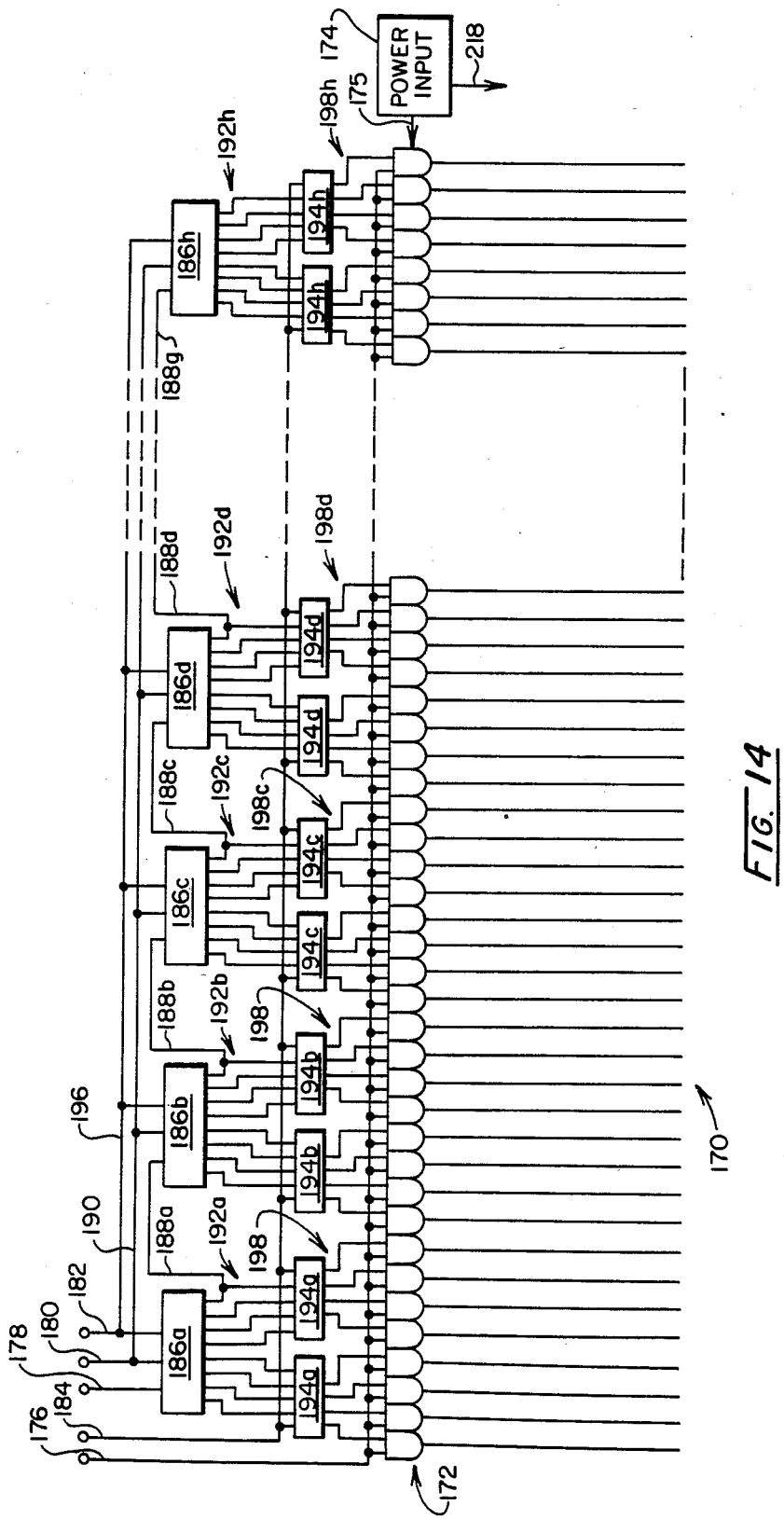

SPATIAL LIGHT MODULATION WITH APPLICATION TO ELECTRONICALLY GENERATED HOLOGRAPHY

BACKGROUND

The development of the laser and related light stimulative technology has generated a significant interest on the part of investigators in that branch of interferometry known as holography. In its underlying concept, holography generally considers that the scattering pattern of light from an object is a transform, or coded record, of the features of that object. Where such a scattering pattern is stored, for example, photographically, an image of the object should be reconstructable. Prior to the availability of an intense coherent light source, a required recordation of such patterns proved most difficult. However, with the availability of the laser as an intense coherent light source and with an innovation wherein the scattering pattern was combined to interfere with a reference beam of coherent light, a photographic wave-front reconstruction was realized. With the interference of reference and reflective subject beams, resultant interference fringes exhibited a recordable contrast representing a measure of amplitude of the subject beam and the position of these fringes represented a recordable measure of phase of the subject beam. Where a photograph of such an interference pattern is illuminated with a laser beam identical with the original reference beam, diffracted light from the photograph will have the same amplitude and phase characteristics as the original beam from the subject.

The most interesting aspect of the holographic reconstruction resides in the very detailed and three-dimensional nature of a resultant image. Additionally, holograms have been found useful in the evaluation of stress exerted upon structural components. The three-dimensional resolution of motion picture holograms has been found helpful in studying microscopic life such as plankton. Holographically produced lenses have found use in aircraft windshield displays, while holographic scanners are used in retail price code scanning assemblies.

For each of the above and other applications, the holographic information storage is photographic in nature and, thus, somewhat limiting in application. However, the relatively large amount of imaging data available in a holographic image record should find extensive application within a broad range of developing technologies. In particular, a significant extension of holographic applications will occur where such records become the subject of electronic storage. Further, where electronic wave-front reconstruction is available, an advantageous holographic imaging and transmission in real time may be achieved.

Recently a system has been devised wherein holographic data may be generated, recorded and/or transmitted as electrical signals for utilization in a broad variety of applications. The system employs an imaging device formed having spaced, mutually orthogonally disposed transparent, planar electrode arrays. Between these arrays there is disposed a dipolar fluid which normally is opaque, but which becomes light transmissive in the presence of an applied electric field. Thus, a matrix of spaced electrode crossing locations is developed which is utilized to generate image pixel positions. A control is electrically coupled with the two electrode arrays for sampling this matrix of locations by generating an electrical field of predetermined value between sequentially selected pairs of electrodes within the arrays. By positioning a light responsive detecting arrangement with the device, an electrical output signal is generated which corresponds with the light intensity of the interference pattern imposed upon the device at any given sample matrix location. The spatial density of the pixel array is quite significant, pixel diameters of about 2 microns which are spaced on 4 micron centers being contemplated.

Essentially the same form of imaging device may be utilized in a reconstruction mode wherein an electrical signal train developed in a construction mode is utilized for purposes of carrying out scanning of the pixel matrix to define pixel diameters corresponding with image intensity. The entire system is described in U.S. Pat. No. 4,484,219 by Ronald L. Kirk, entitled "Electrically Generated Holography", issued Nov. 20, 1984.

Because of the relatively high spatial frequency of the pixel format of the imaging devices, it has been observed that some "cross-talk" or field interference occurs in conjunction with those pixel locations which are adjacent an address pixel location. Further, the form of pixel which is generated has been observed to occur not necessarily as a transparent cylindrical form but, as a grouping of four transparent areas arranged in quadrature about the center position of a given pixel. In view of the large spatial frequency of pixels, some form of scan updating is desirable, particularly in a reconstruction mode of operation. However, typical approaches for scanning update as are encountered in videotechnologies and the like are not particularly desirable for the instant utilization. This stems from the earlier-noted high spatial frequency of the pixel locations.

When the instant devices are utilized in conjunction with systems generating images for human vision, the control circuitry providing for their operation also must be capable of accommodating the noted relatively high spatial frequency of pixel format in a manner developing a desired frame rate. Where frame rates fall below, for example, about 30 frames per second, undesirable flicker phenomena may be observable in any viewed image. Achieving such frame rates utilizing conventional point-to-point scanning techniques will be found to be generally ineffective inasmuch as frame rates necessarily are dependent upon the rise time requirements of any given pixel. Thus, notwithstanding the very high scan rates available with current electronic scanning approaches, the development of adequate frame rates for devices of the instant character becomes an elusive task.

The above-described device or structure as initially developed for applications with holographic systems has been found to exhibit advantageous utility in a broadened range of optical processing applications wherein it functions generally as a spatial light modulator. Current spatial light modulation devices suffer a variety of operational deficiencies, for example, exhibiting insufficient contrast ratios and lack of resolution. Recourse to the instant technology with respect to optical processing requirements otherwise looking to spatial light modulation techniques promises considerable operational enhancements.

SUMMARY

The present invention is addressed to a system and spatial light modulation apparatus wherein holographic data and the like may be generated, recorded and/or transmitted as electrical signals for utilization in a broad variety of applications. Additionally, the apparatus may be employed to generate holographic images in response to such electrical signals. The apparatus includes a converter or image plate structure which is configured having spaced arrays of thin, transparent electrodes between which is disposed a normally opaque dipolar fluid. By applying a suitable voltage to select, oppositely disposed ones of the electrodes, an electric field is developed between them at their cross-over locations to cause the dipolar particles of the normally opaque fluid to align therewith and cause the formation of a discrete transparent pixel or aperture. A highly desirable shaping of this field derived pixel is evoked in consequence of the employment with the converter of a field restriction arrangement. This latter arrangement was evolved from a discovery of an unusual field forming characteristic of the apparatus which, without correction, promoted undesirably segmented pixel shapes and "cross-talk" phenomena.

As a consequence of its unique structure, the optical device of the invention advantageously may be employed to perform as a spatial light modulator (SLM) in a broad variety of applications.

As another feature and object of the invention, the above-discussed field restriction arrangement may be provided as a pair of electrically conductive masks or layers which are positioned within the apparatus adjacent each of the transparent electrode arrays and each of which are formed having openings aligned with the noted cross-over locations for the oppositely disposed electrodes of the arrays. By electrically communicating the conductive layers or masks, an effective dissipation of laterally directed flux or field components is achieved in an ideal passive fashion.

As another feature and object of the invention, there is provided a spatial light modulator of the type described having an advantageous latching feature which is evolved by the utilization of the characteristics of the dipolar fluid disposed intermediate the electrode arrays. By incorporating mutually spaced transparent latching electrodes within the converter assembly and selectively applying a predetermined field inducing voltage thereto of value below that normally required for dipolar particle alignment, transparent pixel formations developed by above threshold field strengths may be maintained for desired dwell intervals.

Another object of the invention provides a control arrangement for the optical devices above described wherein frame rate performance is advantageously enhanced. By sequentially loading one array of transparent electrodes with a string of data inputs utilizing a serial-in-parallel-out approach and activating one select electrode of the complementary array thereof, frame rates are limited only by the rise and decay times of the single pixel.

As a further feature and object, the invention provides an optical device as above mentioned which incorporates a light responsive detecting arrangement wherein an array of photo-responsive components are positioned such that each such component of the array is substantially aligned with a select electrode of the array thereof adjacent the entrance or light incident side of the device. The outputs of these discrete components are employed to provide electrical output signals utilized to derive pixel diameter definition.

A further object of the invention is to provide a spatial light modulator for use in treating holographic data wherein a first array of parallel, transparent, electrically conductive electrodes are supported upon a first support in a first predetermined orientation, while a second array of parallel, transparent electrically conductive electrodes are supported from a second support in a second predetermined orientation in a manner defining with the first array of electrodes a matrix of electrode crossing locations. A normally opaque medium is positioned intermediate the first and second supports which is formed having a suspension of dipolar particles normally randomly dispersed therein, these particles being movable into alignment with an applied electrical field of at least threshold value to effect a transmissive condition within the medium in a region defined by the field. A field restriction arrangement is provided which is positioned adjacent each electrode crossing location and adjacent each of the first and second electrode arrays for dissipating flux components of an applied electrical field which extends laterally from such crossing location. Control is provided which is electrically coupled with each of the first and second electrode arrays for applying select holographic data signals of at least threshold value thereto.

Another object of the invention is to provide apparatus for converting a holographic interference pattern to electrical signals which includes first and second supports spaced a predetermined distance apart, the first support having a transparent surface positionable to receive the interference pattern. A first array of parallel, electrically conductive electrodes is supported in a first predetermined orientation from the first support, while a second array of parallel, electrically conductive electrodes are supported in a second predetermined orientation adjacent the second support to define with the first array of electrodes a matrix spaced electrode crossing locations. A normally opaque, dipolar, electro-optical medium, transmissive in the presence of an applied electrical field is positioned intermediate the first and second supports. Means are provided adjacent each of the electrode crossing locations for dissipating laterally disposed flux components of the applied electrical fields and control means are provided which are electrically coupled with the first and second electrode arrays for sampling the matrix of locations by applying an electric field of predetermined value between selected pairs of electrodes within the first and second arrays thereof. A detection arrangement is provided adjacent the second support for deriving an electrical output signal for responding with the intensity of an interference pattern at a sampled matrix location.

As another object of the invention, apparatus is provided for generating a hologram in response to holographic data derived as a sequence of electrical data signals, such data signals corresponding with the intensities of an interference pattern sampled in the scan of a matrix of uniform discrete apertures adjacent such pattern. The apparatus includes first and second spaced planar supports and includes a first array of electrically conductive electrodes supported in a first predetermined orientation adjacent the first transparent support and a second array of electrically conductive electrodes supported in a second predetermined orientation by the second support to define with the first array of electrodes a matrix of electrode crossing locations. A normally opaque medium is provided intermediate the first and second supports which includes a suspension of dipolar particles normally randomly dispersed, such particles being movable into alignment with an applied electrical field to effect a transmissive condition of the opaque medium. Field restriction means are provided adjacent each of the electrode crossing locations for dissipating flux components of an applied electrical field which laterally extend from such crossing locations. A first transparent, electrically conductive latching electrode is provided adjacent the first support while a corresponding second transparent, electrically conductive latching electrode is positioned adjacent the second support. A control arrangement is provided which is electrically coupled with the first and second electrode arrays which is responsive to the data signals for generating an electric field of at least the threshold value corresponding with the data signals between electrodes of the first and second arrays at the crossing locations and the control arrangement additionally provides for the generation of an electrical field intermediate the first and second latching electrodes having a value selected below the threshold value for effecting a retention of a pre-existing dipolar particle alignment.

Other objects of the invention will, in part, be obvious and will, in part, appear hereinafter.

The invention, accordingly, comprises the apparatus and system possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 13 is a schematic, pictorial representation of the construction an reconstruction mode components of a real time holographic system of the invention;

FIG. 14 is an equivalent schematic circuit diagram showing a portion of a vertical electrode control arrangement of the invention.

DETAILED DESCRIPTION

Figure 1:
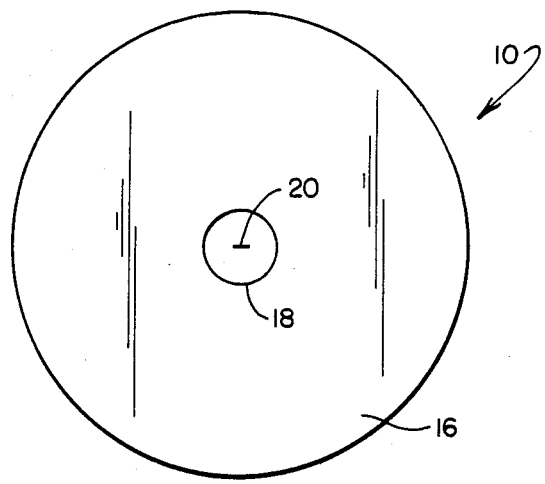
FIG. 1 is a front view of an optical device fabricated in accordance with the invention.
Figure 2:
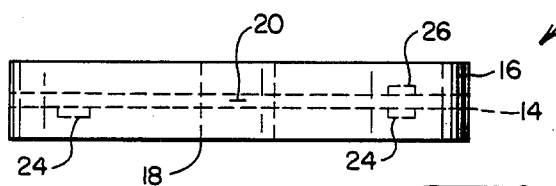
FIG. 2 is a side elevational view of the optical device of FIG. 1 showing internal structure in phantom.

The optical device the instant invention may be utilized either in conjunction with the generation of real time holographic records or as a form of spatial light modulator. With the exception of configurations employed for the construction of real time holographic records, the optical devices have a common design or structure. Referring to FIGS. 1 and 2, front and side views of the optical device 10 reveal it to have a thin cylindrical shape, the larger, more discernible components of which include an annular internal structure 14 which will be seen to include such components as supporting transparent quartz substrates and the like. This support structure 14 is contained within a protective package 16 which may be an epoxy or the like which is opaque and which extends from its outer periphery to an internal cylindrical border 18 to define an annular window accessing the center of the internal support structure 14. Within border 18 and accessible to externally developed light is a rectangularly shaped active area 20 supported internally within the support structure 14. The entire device may be relatively small, for example the diameter of the protective package 16 may be about 7.6 cm while its thickness may be about 1 cm. The window defined by cylindrical border 18 may have a diameter of about 1 cm, while the rectangular active area 20 may be about 2 mm in length and about 0.25 mm in width.

Figure 3:
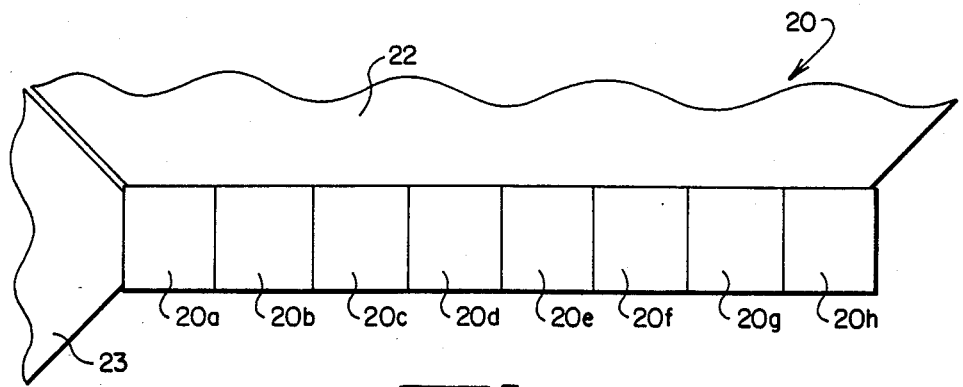
FIG. 3 is a schematic representation of the channel positioning within the active region of the optical device of FIG. 1.
Figure 4:
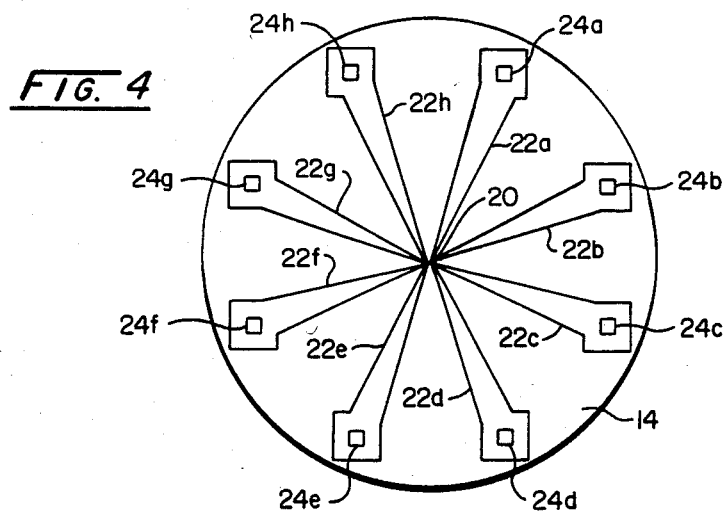
FIG. 4 is a schematic representation of the optical device of FIG. 1 showing the integrated circuitry associated therewith and connecting fan-out leads.
Figure 5:
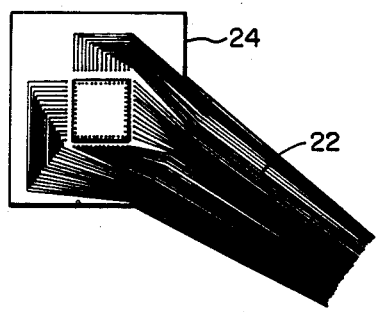
FIG. 5 is a pictoral representation of an integrated circuit shown in FIG. 4 and associated fan-out leads.

The active area 20 is subdivided for control purposes into a linear sequence of channels. Referring to FIG. 3, an enlarged representation of the area 20 is revealed to include 8 discrete rectangular channels 20a–20h arranged as an elongate strip. Each of the channel designated areas 20a–20h incorporates orthogonally disposed pixel defining transparent electrodes which are accessed electronically in a vertically designated sense from a fan-out region represented generally at 22 and in a horizontal sense from a fan-out region 23. Referring to FIG. 4, the vertical fan-out regions depicted generally at 22 in FIG. 3 are shown at 22a–22h as extending from respective channel active regions 20a–20h. The figure reveals that the fan-out regions 22a–22h extend, respectively, to discrete integrated control circuits or chips represented, respectively at 24a–24h. These chips, generally designated as 24, are mounted upon the internal support structure 14 along with the fan-out areas 23 and 24 as represented in FIG. 2. FIG. 2 also shows a control chip or integrated circuit 26 mounted upon the opposite side of support structure 14 which is associated with the horizontal fan-out region 23. Looking to FIG. 5, a pictorial representation of the association with any of the fan-out regions represented generally at 22 with an integrated circuit or chip which is represented generally at 24 is provided.

The active area 20 of device 10 is structured having two planar and transparent substrates such as quartz or the like from which are internally supported two mutually facing arrays of very thin and transparent electrode strips. In general, these electrodes are utilized in conjunction with an electro-optical medium which will be normally opaque to light transmission. However, when this medium is subject to an applied electric field, a transparent cell is developed therewithin, the geometric characteristics of which are correlatable with the strength and shape of that applied field. One such medium, for example, is provided as a dipolar fluid formed of Herapathite dipoles which are sub-micron needle-like crystals of idoquinine sulfate. The optical transmissivity of this dipolar fluid is dependant upon the orientation of these crystals which, in turn, can be controlled by an electric field. In a randomly oriented state, the crystals render the fluid relatively nontransmissive to illumination, while oriented under the effect of an applied electric field, the state of the fluid becomes transparent. Concerning such fluids, the reader's attention is directed to the following publication:

"An X,Y Raster Utilizing a Dipolar Electro-optical Medium" by Marx, Proceedings of the SID, vol. 11/1, 1st Quarter 1970, pp 2-5.

Figure 6:
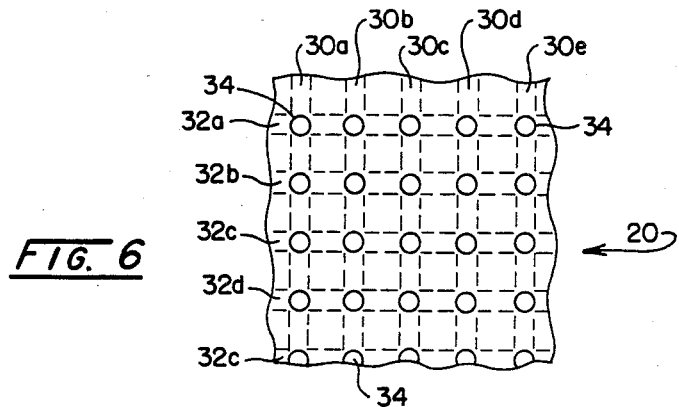
FIG. 6 is a fragmentary, non-scale schematic representation of orthogonally-disposed electrode cross-over locations and resultant pixels as derived by the active area portions of the device of the invention.
Figure 7:
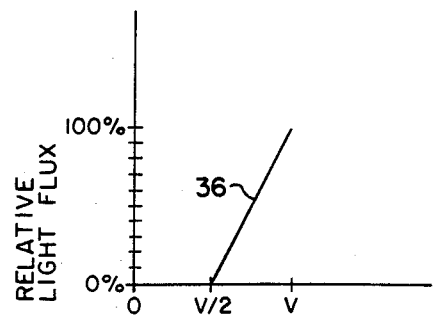
FIG. 7 is a schematic representation of the increase of light flux transmitted through a pixel defined by the device of the invention with increasing electrode matrix voltages.

For the active area size discussed in conjunction with area 20, and for an electrode-to-electrode parallel spacing for each array of four microns, the eight channel arrangement discussed in FIG. 3 provides an array format of 512×64 electrode matrix intersections to develop 32,768 resolvable points or pixels. Looking to FIG. 6, an enlarged, non-scale, fragmentary view of the matrix thus developed is represented wherein transparent electrode strips 30a–30e, which may be designated as "vertical" electrodes are orthogonally associated with transparent electrodes 32a–32e of a "horizontal" array thereof. When an appropriate voltage is applied to these spaced arrays, a sequence of cylindrically shaped "tunnel" type pixels as at 34 may be developed. These pixels 34 will have a diametric extent dependent upon the strength of the applied field, the diameter generally varying from about 1 um to about 2 um. Looking to FIG. 7, a representation of the relative light flux transmission through a given pixel 34 with respect to the voltage applied to develop the noted field strength is represented by curve 36. Commencing with a threshold level of (V/2) which, for example, may be about 7 volts, a generally linear relationship will exist between this applied field and relative light flux output until full opening is achieved with an application of voltage, V, which for example, may be about 15 volts peak-to-peak.

Figure 8:
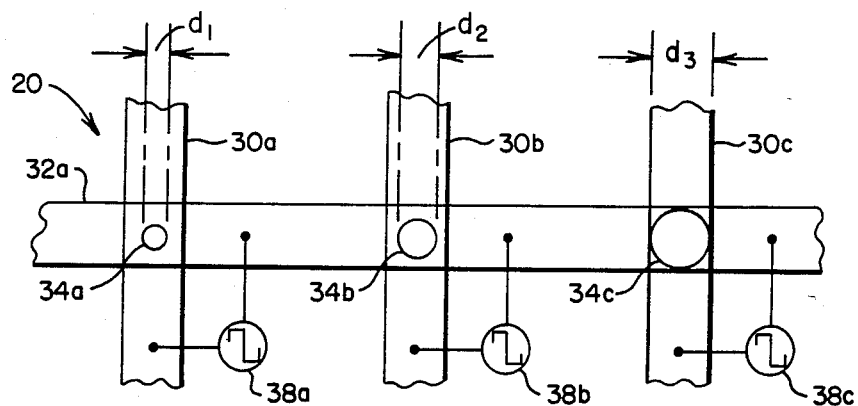
FIG. 8 is an enlarged, non-scale and schematic representation of the development of varying pixel diameters at electrode matrix cross-over locations by the device of the invention.

Referring to FIG. 8, the latter pixel development is represented in conjunction with vertical electrodes 30a–30c and horizontal electrode 32a. The exaggerated drawing shows that for an applied a.c. derived threshold voltage, for example 7 volts peak-to-peak, a pixel 34a will be developed at the electrode intersection having a diameter d1 of about 1 um. Where this applied voltage is increased to 11 volts peak-to-peak, an intermediate diameter, for example of about 1.5 um is developed as represented at diameter d2 and pixel 34b. Pixel 34c shows a maximum diameter which is achieved with the application of a saturation level voltage across electrodes 32a and 30c. This develops a pixel of diameter d3, for example of about 2 um. The applied a.c. voltages are represented in FIG. 8 by sources 38a–38c which are represented as being associated with horizontal electrode 32a and respective vertical electrodes 30a–30c.

Figure 9:
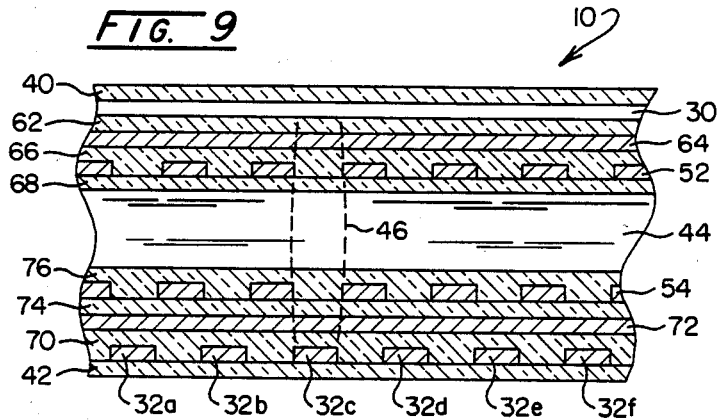
FIG. 9 is a sectional, exaggerated view of a portion of the active area of an optical device according to the instant invention.

Referring to FIG. 9, a schematic an non-scale representation of the optical device 10 of the invention which may be utilized both in the field of holography and in numerous applications as a spatial light modulator is revealed. This structure includes two spaced supports 40 and 42 which are planar and transparent and may be provided as quartz or glass sheets or an appropriate equivalent thereof. Supports 40 and 42 are electrically insulative and serve to position the noted two arrays of transparent, electrically conductive electrode strips as represented by a vertically designated electrode 30 and horizontally designated electrodes 32a–32f. For the instant embodiment, these electrode arrays are mutually orthogonally oriented and perform in conjunction with the above-discussed dipolar fluid represented at 44 which is confined with the electrode arrays between supports 40 and 42. With the arrangement shown, the orthogonally disposed electrode arrays define a matrix of intersections of spaced apart electrodes and with the application of a field developing voltage as discussed in conjunction with FIGS. 7 and 8, the field established at a given cross-over location causes the dipolar particles of the fluid 44 to align and create a transparent region. Ideally, such region will be somewhat cylindrical in shape. For example, a voltage at threshold level or above applied with respect to electrodes 30 and 32c will provide a small, "tunnel" shaped transparent region represented by dotted outline 46 at the unique electrode cross-over position.

Figure 10:
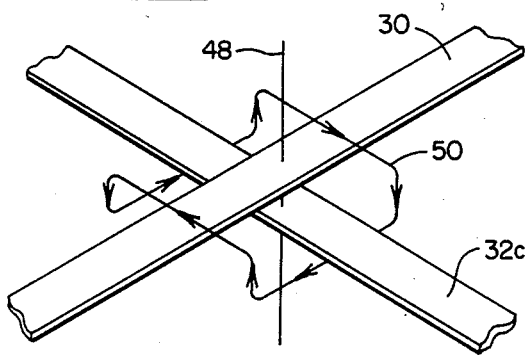
FIG. 10 is an exaggerated schematic representation of a cross-over location of the electrode matrix structure of the invention showing an uncorrected flux path.

In the course of development of optical devices as at 10, a phenomenon was observed in connection with the excitation of two given electrodes. Instead of the unitary, somewhat cylindrical form of transparent region or pixel aligned with the center of cross-over of the electrodes as shown at 46 in the figure, four small transparent regions were seen to be located essentially at the quadrants of the cross-over positions of the electrodes. Further, a form of "cross-talk" phenomenon was observed. In the latter regard, cross-over locations adjacent to that cross-over location selected or sampled were observed to have become transparent due to the development of some form of electric field thereat. As the field strength of the elected cross-over location was increased, the extent of "cross-talk" also increased. The inventor then determined that an unusual electric field pattern had developed in consequence of the geometry of the device 10. Referring additionally to FIG. 10, transparent electrodes 30 and 32c are reproduced schematically and in perspective. Normally, it would be expected that an electric field developed across the intersection of these electrodes would be concentrated precisely at their intersection as represented by axis 48. To the contrary, however, it was determined that an electric field had developed which follows the path represented at 50. Note that this path crosses electrode 30, whereupon it turns downwardly and then crosses electrode 32c, whereupon it turns upwardly and again crosses electrode 30 to again turn downwardly and cross electrode 32c. This field geometry will correspond to the quadrature form of tranparency which was observed. Normally, it is expected that an electric field or the flux defining that field will not turn somewhat sharply as represented in FIG. 10. However, because of the dipolar nature of the fluid 44, it was opined that the flux components of the applied electric field were essentially guided into the pattern shown. Thus, the pixel which developed was opaque at the axis 48, while being transmissive at the quadrature positions of the cross-over location. The lateral spreading of the field also served as an explanation of the "cross-talk" phenomena wherein transparent regions would develop adjacent the sampled cross-over position. With this analysis at hand, it then became apparent that a form of field restriction was required for dissipating flux components of the applied electrical field which extended laterally from each cross-over location of the electrodes.

Figure 11:
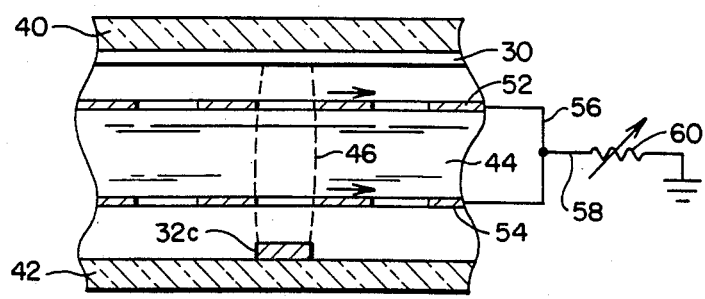
FIG. 11 is a partial schematic representation of the active area of the device of the invention showing electronic functions in enlarged detail.

Referring to FIG. 11, a field focusing arrangement found effective to correct the above-discussed phenomenon is represented schematically. In the figure, the exemplary vertical electrode 30 again is shown mounted upon support 40, while exemplary horizontal electrode 32c is represented as mutually orthogonally disposed and mounted upon support 42. Lateral field dissipation is provided through the utilization of metallized masks 52 and 54 which are supported ultimately from respective supports 40 and 42. The masks 50 and 54 contain a matrix of openings, each such opening being aligned with a cross-over location of the matrix defined by the orthogonally disposed electrode arrays. Generally, the mask is formed by the deposition of a metal such as aluminum upon the sub-structure along with a subsequent photo-controlled etching thereof to provide the matrix of openings as shown. Conductive layers or masks 52 and 54 are electrically coupled, as represented by line 56, to effect lateral field flux dissipation. In this regard, as laterally directed field flux lines commence to propagate, they are intercepted by the conductive layers 52 and 54 and will be manifested as an induced EMF having a propagation direction which is the same for each of the layers 52 and 54 as represented by the arrows positioned thereon. By effecting a common electrical connection as represented by line 56, the induced EMFs cancel to effect a dissipation of lateral field phenomena. This arrangement has been found to be quite effective as a field focusing technique, generally cylindrical transparent regions as at 46 being developed in consequence of the field focusing which are in alignment with the axis of cross-over for an elected pair of electrodes. Further, the "cross-talk" phenomenon is eliminated. Where desired, line 56 may be coupled to ground through a variable resistor or equivalent as represented at line 58 and resistor 60. By adjustment of the resistor 60, a corresponding adjustment of the potential of the parallel fields serving to close adjacent pixels may be provided. Such an adjustive arrangement may be utilized to provide a sustaining field under but close to the threshold potentials required for pixel formation.

For a variety of operational applications of the optical device 10, it will be desirable to provide a lengthy dwell time for pixel formation. This dwell interval should be sufficient such that all elected or sample pixels or apertures of the active area remain open for a variety of different time intervals. In this regard, where real time holographic reconstruction is desired, then the image developed by the active area 20 should remain extant for a full frame of hologram definition. While a variety of electronically based refreshing techniques have been described in the art for achieving desired frame image maintenance in related arts, the unique structure of the device 10 permits resort to a latching approach to maintain a frame image. Generally, the decay interval characteristics of pixel formation are slower than the rise time characteristics for dipolar fluids as at 44. This follows, inasmuch as the decay interval is determined by the simple expedient of removing the imposed electric field and allowing Brownian torque to randomize the dipole particles. Conversely, the rise time interval stems from a positive activity of forcing the dipole particles into an alignment with the imposed field. While the decay rates are relatively, advantageously slow, for many of the applications envisioned for device 10, the number of pixels which must be maintained for a frame is so large that additional image holding techniques should be employed. It readily is conceivable that optical devices as at 10 for some applications may contain over one million cross-over locations.

Now considering the structure of device 10 in more detail and looking to the implementation of the latching feature, reference again is made to FIG. 9. The electrodes 30 of the vertically designated array thereof may, for example, be formed of transparent, indium-tin oxide which is deposited upon a quartz support 40. Similarly, the electrodes 32 of the horizontal array thereof are formed of the same material and are deposited upon support 42 which may be provided as a quartz sheet. Over the array of electrodes as at 30, there is deposited a transparent insulative layer, for example of polymethyl methacrylate (PMMA) as represented at 62. For the purpose of developing the noted latching function, a layer of transparent conductive material such as indium-tin oxide then is deposited over insulative layer 62 as represented at 64. Over this conductive layer 64 there is deposited another transparent insulative layer 66 which again may be PMMA an upon insulative layer 66 there is formed the earlier-described metallic mask 52. Over the mask layer 52, there then is deposited another insulative layer 68 which, for example, may be formed of PMMA.

In identical fashion, the horizontally designated array of electrodes as at 32a–32f are covered with an insulative layer, for example of PMMA as represented at 70. A latching, electrically conductive transparent layer, for example of indium tin oxide 72 then is deposited over the PMMA coating 70. A next insulative layer 74 is deposited over the conductive layer 72 and over the insulative layer the earlier described metallized layer or mask 54 is formed. Finally, a transparent, insulative layer or coating 76, for example of PMMA, is deposited over the mask or perforated metallic layer 54.

When the latching feature is employed, a voltage is applied to conductive layers 62 and 72. The value of the voltage so applied is selected below the threshold value required to effect an alignment of the dipole particles of fluid 44. However, when a pixel forming voltage level above that threshold level is applied to a selected electrode pair as at 30 and 32c, the dipole particles will rapidly align to establish a transparent pixel as represented by the dashed line 46. When the pixel forming voltage above threshold is removed, the latching voltage is applied through layers 62 and 72 and this level is sufficient to maintain the orientation of the pixel defining dipoles until the latching voltage is removed. Where, for example, a 10-volt peak-to-peak level pixel forming voltage is employed, the latching voltage level may be selected as about 5 volts peak-to-peak. Because the dipolar fluids as at 44 react as if to exhibit ion poisoning effects, both the latching fields developed as well as pixel formation fields are derived using an a.c. input. Certain of the noted effects appear to be caused by the geometric shape of the particles of the fluid 44 themselves. It has been determined experimentally that providing the fields at an a.c. frequency of about 2.1 kHz is desirable.

Exemplary of techniques for developing the electrode array matrix is the use of indium oxide or the above-noted indium-tin oxide as the electrode material. Development of the elongate thin electrodes may be by a photolithographic liftoff approach wherein the substrate is coated with a positive photoresist that is subsequently exposed to form the desired array pattern. The resist-coated substrate then is developed to generate a negative of the desired pattern. As a next step, for example, a 1,000 Angstrom unit thick indium oxide film is deposited on the substrate and the resist pattern. Following this deposition, the substrate is immersed in a resist solvent which removes the remaining resist and the overlaying indium oxide coating leaving an indium oxide pattern on the surface. The undercutting of the resist pattern allows the solvent to penetrate and dissolve the resist. The electrode pattern may be generated by recording in a thin photoresist layer an interference pattern created by two overlapping coherent light beams generated from a laser, for example, an argon ion laser. The line-pair spacing of the interference fringes corresponds to the desired electrode spacing and the fringe spacing may be adjusted by varying the angle between the two overlapping laser beams. This technique is capable of generating patterns with spacings ranging from $\frac{1}{4}$ micron to several microns over an area of several square centimeters. Alternatively, a masking technique may be used for structures with dimensions greater than approximately 1 micron.

Optical device 10 as described hereinabove has utility in a wide variety of applications. For example, it may be utilized in the reconstruction mode of real time holography. Additionally, the device will find a broad variety of uses in optical processing as a spatial light modulator and in this regard has been referred to as an "Optical Tunnel Array" processor (OTA). The same basic features of device 10 are employed for developing an optical device suited for the construction mode of real time holography.

Figure 12:
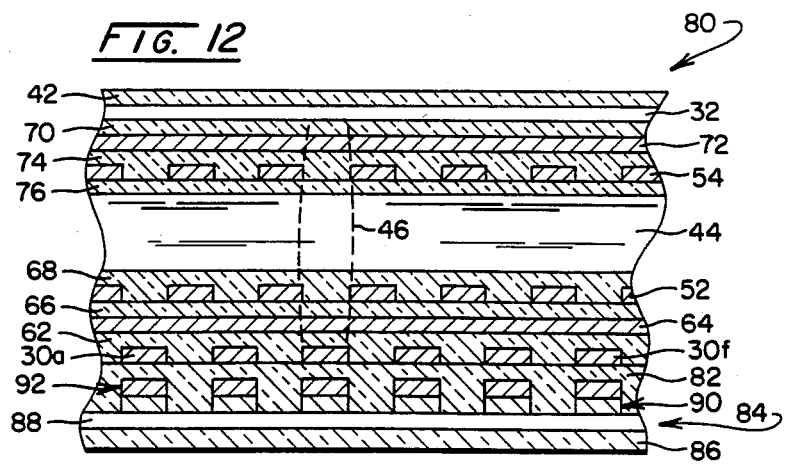
FIG. 12 is a sectional, exaggerated view of a portion of an optical device structured according to the invention.

Referring to FIG. 12, an adaptation of device 10 effecting its suitability in a construction mode of holography is revealed at 80. Inasmuch as a substantial number and arrangement of the components of device 80 are identical to those of device 10, where common components are employed, the same identifying numeration is utilized. In this regard, note that the horizontal array of electrodes as at 32 may be provided as indium-tin oxide depositions upon a transparent support 42 formed of quartz, glass or the like. Deposited over the horizontal electrode array 32 is an insulative covering or layer 70 which may be formed PMMA as above described. Over the surface of the insulative layer 70 there is deposited a transparent electro-conductive layer 72 serving the above-noted latching function. This layer may, for example, be formed of indium-tin oxide. The latter layer 72 is insulated by another insulative layer, for example of PMMA as represented at 74. Over the layer 74 there is formed a perforate metallic mask as earlier described at 54 and the latter mask 54 is covered with a final insulative layer, for example PMMA as at 76. The latter layer is in contact with dipolar fluid 44 which extends to a similar insulative layer formed, for example of transparent PMMA as at 68. Layer 68 is coated over the oppositely disposed perforated metallic mask 52. Mask 52 is positioned over another transparent insulative layer 66, which may be formed of PMMA. Insulative layer 66 is positioned over a latching layer 64 formed of transparent indium-tin oxide. Another insulative layer 62 of PMMA is positioned beneath latching layer 64. Layer 62 serves to insulate the vertical array of electrodes, two of which are identified at 30a and 30f. The electrodes of the vertical array, in turn, are positioned upon an insulative coating or layer 82 which may be formed as PMMA. Coating 82 insulates and surmounts a detecting or amplitude readout assemblage represented generally at 84 which is supported from a support or substrate 86 which, in turn, is opaque to radiation but which may be formed of quartz or glass or the like. In this regard, the support 86 initially supports an electrically conductive biasing layer 88 which may be provided as indium-tin oxide or the like. Over conductive layer 88 there is deposited a series of narrow strips of a photoconductive material in an array represented as at 90. The parallel strips of the array 90 are at least coextensive with the vertical electrode strips 30a-30f and may be formed of a material responsive to the intensity of light impinging thereon such as cadmium sulfide, amorphous silicon materials or the like. Each of the photo-conductive strips within array 90, in turn, are covered by a conductive transparent strip within an array thereof at 92. The strips within array 92 may be formed of transparent indium tin oxide and with the arrangement shown, it may be observed that the photoconductive strips are sandwiched between two electrically conductive components represented by biasing layer 88 and array 92. In operating the photoresponsive components 84, a bias is imposed at conductive biasing layer 88 and the discrete outputs of each conductive strip of the array 92 are scanned or polled to derive electrical data signals. Where light impinges upon a given photoconductive strip within array 90, a proportional output will be witnessed at the appropriate one of the conductive strips within array 92. During operation of the device 80, the strips within array 92 are scanned in syncrhonism with the identification of the affected pixel or transparent electrode cross-over matrix location. The pixels defined during the construction phase of operation are all of a uniform predetermined diameter such that the photoresponsive readout will have appropriate amplitude-phase values.

Optical device 80, as described in conjunction with FIG. 12, operates in a construction mode within a holographic system in association with a corresponding reconstruction mode optical device 10. A general configuration of a real time projection holographic oriented system is represented schematically in FIG. 13. Referring to that figure, the construction mode components of the system are shown to include the optical device 80 having an annular package 100, window 102 and active area 104. Device 80 is positioned to generate real time holographic data corresponding with an object or target 106. Coherent illumination for the construction mode of operation includes a source of coherent light 108 which may be provided as a laser, for example, having a light output at 6328 Angstrom units. Laser 108 generates a coherent light beam 110 which is directed to the surface of a beam splitter 112. Beam splitter 112 establishes one component of the light source as an object beam 114 which is expanded at a positive power dispersion or expanding lens 116. The object beam then is reflected from a mirror 118 and thereupon impinges upon and illuminates the object or target 106. That component of beam 110 passing through beam splitter 112 serves as a reference beam 120 which is reflected from a mirror 122 to be expanded at an expanding lens 124 and impinge upon the active area 104 of optical device 80.

In projection forms of holography, the reconstruction and image projection of a hologram requires a relatively wider angle of acceptance at the viewing station. This requires that the construction phase of the holographic system collect sufficient information to achieve an aspect ratio permitting this wider acceptance angle and developing sufficient holographic information within the necessarily minimal area available at active area 104. The extent of the active area 104 is necessarily small because of the high level of resolution required to capture the spatial frequency of a holographic interference pattern. Inasmuch as human visual perception can accommodate a three-dimensional aspect of the image using a higher level of a horizontal aspect of information, appropriate optical components are used within the projection system. In this regard, the object modified beam 126 is directed toward active area 104 through a combined two-dimensional dispersion medium which scatters light in horizontal directions only and a cylindrical lens which has curvature in the horizontal direction only as represented at 128. The dispersion medium at the incident surface of the optical element 128 is formed as a structure which imparts to a light wave front passing therethrough a periodically varying phase thereacross in a horizontal direction with a substantially zero relative phase change across the wavefront in a vertical direction. Note that the dispersive medium is shown as a series of periodic ridges and grooves scored in the face of the element 128.

Device 80 is controlled in an off-board context from a control function represented at block 130 shown associated with the deviced 80 through a multi-lead bus 132. Synchronizing control is asserted to device 80 through control 130 from a master clock represented at block 134 having an output at lines 136 and 138. Additionally, the above-discussed bipolar frequency which is selected as about 2.1 kHz is shown developed off-board at block 140 which is coupled to provide this bipolar functioning signal from lines 142 and 144.

It may be recalled from the discourse in conjunction with FIG. 12 that the pixel size defining electrical data signals deriving from active area 104 are developed in a series of vertical outputs. These outputs are polled or scanned from circuit 130 and multiplexed for each channel to develop serially derived data outputs from block 130 which are transmitted along a bus as at 146. Additionally generated are scanning synchronization signals for frame definition control. Bus 146 as well as master clock input from line 138 and bipolar frequency input from line 144 are shown directed to a corresponding control function at block 148. Block 148, in turn, performs an appropriate decoding and control function for the operation of optical device 10 through inputs as represented at multi-lead bus 150. Optical device 10 has been described hereinabove and, when operating in a reconstruction mode in real time holography, is synchronized from master clock 134 through line 138 and receives the synchronized noted 2.1 kHz bipolar signal from line 144 as well as appropriate frame controlling synchronizing signals. Where desired, frame defining synch signals may be generated by both devices 80 and 10 to provide a parity control format. The active area 20 of device 10 is illuminated from a coherent source 152 having the same characteristics as source 108, and the output beam 154 thereof is expanded at lens 156 to impinge upon one side of active area 20. To avoid right-left reversals or pseudoscopic effects, the scanning operation of the vertical and/or horizontal electrodes of device 10 may be reversed in a right-to-left sense and an up and down sense.

The image carrying beam 156 defracted at active area 20 is directed back through a cylindrical optical element 158 to form an image 106' of the target or object 106. Note that optical element 158 corresponds with that at 128. In order to increase the vertical spread of the image-carrying beam 156, a lenticular screen 160 having small horizontal cylindrical elements is positioned within the space occupied by the object image 106'. The cylindrical elements of the lenticular screen 160 should not affect the horizontal component of the image information and additionally should be small enough so that the screen is not itself visibile to observers at eye station 162. For a more detailed discourse of projection forms of holography reference is made to St. John, U.S. Pat. No. 3,625,584 entitled "Three-dimensional Large Screen Movie Techniques Employing Holography and a Cylindrical Optical System" and the following publication:

"Progress on the Holographic Movie Process in the USSR" by Komar, SPIE vol. 120, Three-Dimensional Imaging (1977) pp 127-144.

To achieve the earlier-discussed desired frame rates of operation for the devices of the present invention, a scanning technique is utilized wherein an entire widthwise line of an active area is scanned at one time. For example, a horizontal line is activated across all eight channels at one time along with the simultaneous activation of all vertical lines within any of those channels. The vertical line outputs then are scanned and the amplitude-phase data or pixel activation information is serially transmitted to a receiving function. With such an arrangement, the frame rate is limited only by the vertical scan rate of the system. In reconstruction performance, the amplitude-phase signals which are serially transmitted to the optical device as at 10 are utilized to define pixel diameter to effect real time hologram definition. Through the use of common synchronization from the master clock function 134 as well as the bipolar signal inputs as at 140, real time holographic image generation becomes available.

As discussed in connection with FIGS. 2 and 4, distinct integrated circuits 24a-24h are provided for each sequence of "vertical" electrodes of each of the channels of the active regions of the devices. Additionally, the arrays of electrodes orthogonally disposed with respect thereto, ie. the "horizontal" electrodes are controlled from an integrated circuit at at 26. The latter, singular integrated sequential line circuit is utilized inasmuch as one electrode for each channel is accessed in terms of a channel line at a time.

Referring to FIG. 14, an equivalent circuit which describes vertical electrode controls for each of the integrated circuits 24a-24h is shown in partially broken away fashion in view of the repetition of components. The arrays of electrodes for any given channel include array pairs of 64 electrodes each. Connections to the 64 "vertical" electrodes are represented by the line array 170. Lines from array 170 are seen to emanate from the outputs of 64 corresponding AND gates represented generally at 172. Each of the 64 AND gates within array 162 receives a discrete power level input as represented at block 174 and this power level input represents either the demultiplexed or decoded output of construction stage amplitude phase information for analog performance. Additionally, the power input may be uniformly applied for digital performance as in conjunction with construction mode holography or in optical processing procedures required in utilization of the devices as a spatial light modulator. To provide one aspect or component of alternating or bi-polar operation, the earlier-noted 2.1 kHz signal, for example as developed at block 140, is introduced simultaneously to one input of each of the AND gates arrayed at 172 from line 176. The latter input to the AND gates at 172 is continuous in nature and the opposite inputs thereto represent discrete pixel defining signals. The genesis of these signals is from four inputs represented at lines 178, 180, 182, and 184. Line 178 is a serial data in (SDI) input to the intial one, 186a of a series of cascade connected eight-bit serial-in/parallel-out shift registers 186a–186h. Register components 188e through 188g are not shown in the drawing in the interest of clarity. However, such register functions will be present in the circuit connected in identical fashion as those components illustrated. By so connecting registers 186a–186h through respective lines 188a–188g, there is developed a 64 bit serial-in/parallel-out register. Serial data representing vertical line activation are clocked through line 178 to the register group 186a–186h through a master clock input, for example operating at 122.8 kHz at line 180 which extends through line 190 to the clock inputs of gates 186b–186h. Following the presentation of 64 input pulses at clock input 180 and through line 190, the serial data transferred across the register sequence will be observed at the outputs of the registers 186a–186h represented in the drawing, respectively, as eight line arrays 192a–192h.

As the 64 pulse loading of the entire register grouping is received, a load signal is developed at input 184 which is directed to the inputs of eight paired four-bit latches, the pairs being identified at 194a–194h having inputs coupled, respectively, with output arrays 192a–192h. As before, paired latches 194e–194g are not shown in the broken portion of the drawing in the interest of clarity. Upon effecting the loading or latching of the latch pairs 194a–194h, a clear signal is directed to the registers 186a–186h from lines 1982 and 196. Thus cleared, the registers 186a–186g are enabled to receive a next 64 bit string of data.

As the 64 bits of data are loaded into the latch pairs 194a–194h, the resultant outputs of these latches are presented at the eight-line outputs of the pairs thereof at eight-line arrays shown, respectively, at 198a–198h. The lines of these arrays lead to the second input of the sixty-four AND gates within array 172. Accordingly, the information then is presented at the corresponding output terminals through fanout leads 170. In effect, a 64 bit informational word is presented to the vertical terminals of the optical device for each channel thereof for the activation of appropriate ones of the cross-over locations providing for pixel definition. When the optical device with which the instant circuit is incorporated is utilized in an analog mode, for example in the reconstruction of real time holographic information, then the amplitude-phase information developed, for example from device 80 is introduced to each discrete ones of the AND gates within array 172 to vary the voltage value at the output lines 170. However, when the device is utilized, for example, in the construction of a hologram the value of power input from block 174 is uniform for all AND gates within array 172. The latter arrangement provides for the development of pixels of uniform diameter. To avoid ion poisoning phenomena or polarization effects caused by the dipolar fluid used with the devices, as noted above, it has been found that an a.c. development of the signals at the orthogonally disposed electrodes provides an acceptable remedy. Accordingly, the 2.1 kHz signal to the opposite inputs of the AND gates at array 172 from line 176 provides one aspect of developing this bipolar presentation of voltage data to the electrode combination.

Figure 15:
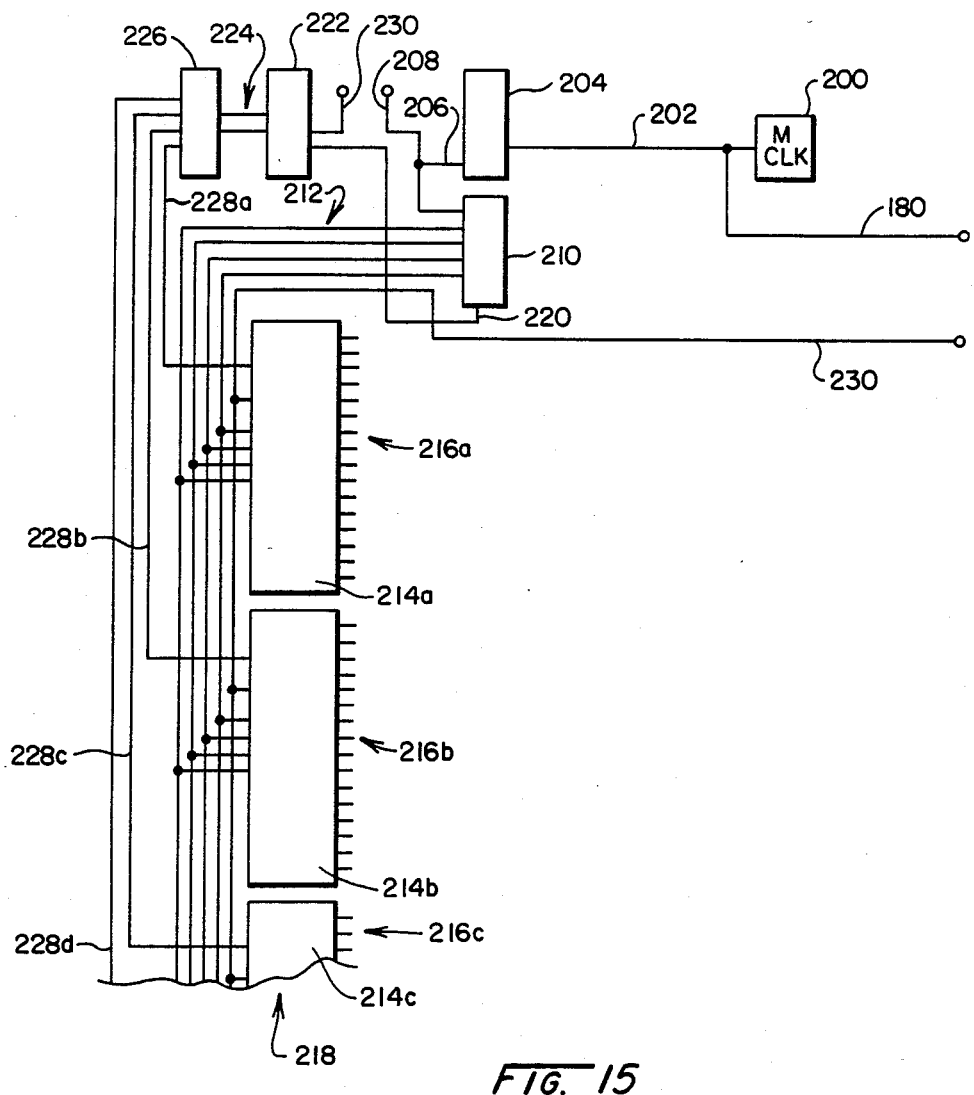
FIG. 15 is a schematic equivalent circuit diagram illustrating portions of the control of horizontally designated electrodes of the electrode matrix of the optical device of the invention.

Referring to FIG. 15, an equivalent circuit arrangement is illustrated for the purpose of describing the performance of the sequential line integrated circuit as at 26 (FIG. 2) used to drive the horizontally designated electrodes for all 8 channels 20a–20h (FIG. 3). In FIG. 15, the master clock function otherwise described off-board at 134 in FIG. 13 is represented at 200 as having an output at line 202 which is coupled through line 180 to the master clock input to register 186a of the vertical array control described in conjunction with FIG. 14. As indicated above, the master clock may, for example, produce a squarewave at a frequency of 122.8 kHz. This master clock input is directed additionally from line 202 to the input of a divide by 64 counter function represented at block 204. Recall that the 64 bit shift register feature in FIG. 14 serves to carry an entire channel width of vertical data for simultaneous presentation to the vertically designated electrodes. Thus, the pulsed output at line 208 is directed to input line 184 to effect the loading of the latching pairs 194a–194h.

Line 208 also extends to the input of a four-bit synchronous counter 210, the four-line output array 212 of which extends to each of four, four-line to sixteen-line decoders 214a–214d. In the interest of clarity, only three of these counters are illustrated, it being understood that the inputs thereto and the outputs thereof are coupled in identical fashion. The sixteen-line outputs of decoders 214a–214d, as represented, respectively, at 216a–216d, are coupled to discrete ones of the horizontally designated electrodes of the active area. The outputs of decoders 214a–214d are normally low and switch to a predetermined high voltage level status upon being addressed from array 212. As represented by arrow 218 extending from power input 174 (FIG. 14), the level of this voltage is determined by the power input or power supply 174 which serves, additionally, to define formed pixel diameter at given electrode matrix cross-over locations. The carry bit output at line 220 of counter 210 is directed to the input of a two-bit synchronous binary counter 222, the two line outputs of which at 224 are directed to the input of a two-line to four-line decoder 226. The four-line output of decoder 226 at lines 228a–228d are directed, respectively, to decoders 216a–216d and serve to select those decoders in predetermined order by connection to their respective inhibit input terminals.

To provide the second component of the 2.1 kHz oscillation of the electrode outputs, a line 230 emanating from the 2.1 kHz supply as described in conjunction with block 140 in FIG. 13 is supplied in inverted form to a second inhibit terminal of the decoders 216a–216d. Thus, the squarewave output of function 140 is phase shifted to the extent of 180° with respect to the corresponding phase applied from line 176 to AND gate grouping or array 172. This arrangement results in a bipolar voltage being developed at a desired electrode matrix cross-over location to avoid ion poisoning effects and the like.

Line 230 leading to counter 222 sees a sync pulse input to carry out a clear function for the horizontal electrode control. When the device is operated in a holographic real time arrangement, a pulse will, for example, be received at input 230 from the construction function to provide a clear input at the start of any given frame. Generally, this sync signal will be an ANDed combination of the carry output of the last horizontal electrode and the last or 64th vertical electrode control. Preferably, the optical devices operating both in construction and reconstruction will develop this synchronous signal and will be ANDed to provide a form of parity. These signals will evoke a clear input to both the vertical and horizontal electrode control circuits. In this regard, note in FIG. 14 that input line 182 to the register function will receive this clearing sync pulse.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:

1. A spatial light modulator comprising:
   first and second spaced, planar supports;
   a first array of parallel, transparent, electrically conductive electrodes supported from said first support in a first predetermined orientation;
   a second array of parallel, electrically conductive electrodes supported from said second support in a second predetermined orientation to define with said first array of electrodes a matrix of electrode crossing locations;
   a normally opaque medium intermediate said first and second transparent supports, having a suspension of dipolar particles normally randomly dispersed therein, said particles being movable into alignment with an applied electrical field of at least threshold field strength value to effect a transmissive condition of said medium;
   field restriction means adjacent each said electrode crossing location and adjacent each said first and second array for dissipating flux components of a said applied electrical field extensible laterally from said crossing locations; and
   control means electrically coupled with each said first and second electrode arrays for applying select signals to predetermined discrete electrodes thereof to form electrical fields therebetween having predetermined values at and above said threshold value.

2. The spatial light modulator of claim 1 in which said field restriction means comprises:
   a first electrically conductive layer supported adjacent said first array and having openings therein aligned with said electrode crossing locations; and
   a second electrically conductive layer supported adjacent said second array, having openings therein aligned with said electrode crossing locations and being in electrically conductive communication with said first electrically conductive layer.

3. The spatial light modulator of claim 2 in which:
   the said electrodes of each said first and second arrays are a transparent metal oxide and said first and second arrays are mutually orthogonally disposed upon the mutually inwardly facing surfaces of said first and second supports; and
   said first and second electrically conductive layers are metallic layers insulatively spaced from respective said first and second arrays.

4. The spatial light modulator of claim 1 including:
   a first transparent, electrically conductive latching electrode adjacent said first support;
   a second electrically conductive latching electrode adjacent said second support; and
   said control means includes means for generating a latching electric field intermediate said first and second latching electrodes having a field strength value selected below said threshold value for effecting retention of a pre-existing alignment of said dipolar particles.

5. The spatial light modulator of claim 4 in which said first and second latching electrodes are metal oxide layers insulatively spaced from respective said first and second electrode arrays.

6. The spatial light modulator of claim 4 in which said control means is configured to apply an a.c. signal across said first and second latching electrodes having a voltage level selected for deriving said latching electrical field.

7. The spatial light modulator of claim 6 in which said control means a.c. signal has a frequency selected at about 2.1 KHz.

8. The spatial light modulator of claim 1 in which said control means comprises:
   register means for applying a first matrix position sampling component of said select signals simultaneously to each said electrode of said first array thereof; and
   circuit means for applying a second matrix position designated component of said select signals to a select said electrode of said second array thereof simultaneously with said application of said first component.

9. The spatial light modulator of claim 8 in which said control means applies said first and second components of said select signals from said register means and said circuit means at a frequency of about 2.11 kHz.

10. The spatial light modulator of claim 8 in which said register means comprises:
    serial-in-parallel output register means having register outputs corresponding with each said electrode of said first array for receiving a predetermined sequence of actuating signals for presenting said sequence of signals at said output;
    latch means having inputs coupled with said register means outputs, outputs corresponding with each said input and responsive to a load command for receiving said sequence of signals;
    level control means having inputs coupled with and corresponding to each said latch means outputs and having outputs coupled with corresponding said first array electrodes for responding to predetermined signal level inputs to provide said select signals forming said electrical field predetermined values.

11. Apparatus for converting a holographic interference pattern to electrical signals comprising:
    first and second supports spaced a predetermined distance apart, said first support having a surface positionable to receive said interference pattern;
    a first array of parallel, electrically conductive electrodes supported in a first predetermined orientation from said first support;
    a second array of parallel, electrically conductive electrodes supported in a second predetermined orientation to define with said first array of electrodes a matrix of spaced electrode crossing locations;

a normally opaque, dipolar electro-optical medium, transmissive in the presence of an applied electric field, positioned intermediate said first and second supports;

control means electrically coupled with said first and second electrode arrays for sampling said matrix of locations by applying an electric field of predetermined value between selected pairs of electrodes within said first and second arrays thereof;

means adjacent each said electrode crossing location for dissipating laterally disposed flux components of a said applied electrical field; and detecting means adjacent said second support for deriving electrical output signals corresponding with the intensity of said interference pattern at a said sampled matrix locations.

12. The apparatus of claim 11 in which said field restriction means comprises:

a first electrically conductive layer supported adjacent said first support and having openings therein aligned with said electrode crossing locations; and a second electrically conductive layer supported adjacent said second support, having openings therein aligned with said electrode crossing locations and being in electrically conductive communication with said first electrically conductive layer 13. The apparatus of claim 12 in which:

the said electrodes of each said first and second arrays are a transparent metal oxide and said first and second arrays are mutually orthogonally disposed upon the mutually inwardly facing surfaces of said first and second supports; and said first and second electrically conductive layers are metallic layers insulatively spaced from respective said first and second arrays.

14. The apparatus of claim 13 in which said dipolar electro-optical medium comprises a suspension of Herapathite dipoles.

15. The apparatus of claim 14 including:

a first transparent, electrically conductive latching electrode adjacent said first support;

a second electrically conductive latching electrode adjacent said second support;

control means electrically coupled with said first and second electrode arrays, responsive to said data signals for generating an electrical field of value corresponding with said data signals between electrodes of said first and second arrays at said crossing locations and for generating a latching electrical field intermediate said first and second latching electrodes having a field strength value selected below said threshold value for effecting a retention of a pre-existing said particle alignment by said threshold value electric field.

16. The apparatus of claim 15 in which said first and second latching electrodes are transparent metal oxide layers insulatively spaced from respective said first and second electrode arrays.

17. The apparatus of claim 15 in which said control means is configured to apply an a.c. signal across said first and second latching electrodes having a voltage level selected for deriving said latching electrical field.

18. The apparatus of claim 17 in which said control means a.c. signal has a frequency selected as about 2.1 KHz.

19. The apparatus of claim 11 in which said detecting means comprises:

a third array of photo-responsive components positioned adjacent said second array of parallel, electrically conductive electrodes, each said component being substantially aligned with a select said first array electrode and having an output for providing a said electrical output signal.

20. The apparatus of claim 19 in which said detecting means comprises:

an electrically conductive biasing layer supported from said second support;

an array of photo-conductive discrete strips positioned in conducting relationship upon said electrically conductive biasing layer, each said strip being aligned and coextensive with a select said electrode of said first array thereof; and an array of transparent electrically conductive strips, each said strip thereof being positioned in conducting relationship with a select said photoconductive strip, and being electrically isolated from said electrically conductive biasing layer whereby each said strip provids a said electrical output signal.

21. The apparatus of claim 20 in which said detecting means includes:

circuit means coupled with each said electrically conductive strip, and bias means coupled with each said electrically conductive strip and said first electrically conductive layer for establishing a predetermined potential difference therebetween.

22. Apparatus for generating a hologram in response to holographic data derived as a sequence of electrical data signals, said data signals corresponding with the intensities of an interference pattern sampled in the scan of a matrix of uniform discrete apertures adjacent said pattern, comprising:

first and second spaced planar supports;

a first array of electrically conductive electrodes supported in a first predetermined orientation adjacent said first transparent support;

a second array of electrically conductive electrodes supported in a second predetermined orientation by said second support to define with said first array of electrodes a matrix of electrode crossing locations;

a normally opaque medium intermediate said first and second supports having a suspension of dipolar particles normally randomly dispersed therein, said particles being movable into alignment with an applied electric field of at least a threshold value to effect a transmissive condition of said medium;

field restriction means adjacent each said electrode crossing location for dissipating flux components of a said applied electric field laterally extensible from said crossing locations;

a first transparent, electrically conductive latching electrode adjacent said first support;

a second transparent, electrically conductive latching electrode adjacent said second support; and control means electrically coupled with said first and second electrode arrays, responsive to said data signals for generating an electrical field of value corresponding with said data signals between electrodes of said first and second arrays at said crossing locations and for generating a latching electrical field intermediate said first and second latching electrodes having a field strength value selected below said threshold value for effecting a retention of a pre-existing said particle alignment by said threshold value electric field.

23. The apparatus of claim 22 in which said first and second latching electrodes are a transparent metal oxide and are insulatively spaced from respective said first and second electrode arrays.

24. The apparatus of claim 22 in which said control means is configured to apply an a.c. signal across said first and second latching electrodes having a voltage level selected for deriving said latching electrical field.

25. The apparatus of claim 24 in which said control means a.c. signal has a frequency selected at about 2.1 KHz.

26. The apparatus of claim 22 in which said field restriction means comprises:
a first electrically conductive layer supported adjacent said first support and having openings therein aligned with said electrode crossing locations; and
a second electrically conductive layer supported adjacent said second support, having openings therein aligned with said electrode crossing locations and being in electrically conductive communication with said first electrically conductive layer.

27. The apparatus of claim 26 in which:
the said electrodes of each said first and second arrays are components of a transparent metal oxide layer and said first and second arrays are mutually orthogonally disposed upon the mutually inwardly facing surfaces of said first and second supports; and
said first and second electrically conductive layers are metallic layers insulatively spaced from respective said first and second arrays.

28. The apparatus of claim 27 in which said first and second latching electrodes are transparent metal oxide layers insulatively spaced from respective said first and second electrode arrays.

29. A system for constructing, transmitting and reconstructing holographs of an object comprising:
means for providing a coherent source of light of predetermined wavelength characteristic;
means for illuminating said object with said coherent source of light;
means for providing a reference beam of a said coherent source of light;
first and second substantially planar supports spaced a predetermined distance apart, said first support having a transparent receiving surface for receiving light reflecting from said illuminated object, and simultaneously, from said reference beam to form an interference pattern;
a first array of parallel, electrically conductive electrodes supported in a first predetermined orientation by said first support;
a second array of parallel, electrically conductive electrodes supported in a second predetermined orientation by said second support to define with said first array of electrodes a first matrix of spaced electrode crossing locations;
a first normally opaque medium intermediate said first and second supports, having a suspension of dipolar particles normally randomly dispersed therein, said particles being movable into alignment with an applied electric field of at least threshold field strength value to effect a transmissive condition of said medium;
a first electrically conductive layer supported adjacent said first support and having openings therein aligned with said electrode crossing locations;
a second electrically conductive layer supported adjacent said second support, having openings therein aligned with said electrode crossing locations and being in electrically conductive communication with said first electrically conductive layer;
first control means electrically coupled with said first and second electrode arrays for sequentially sampling said matrix of locations by generating an electrical field of predetermined value between sequentially selected pairs of electrodes of said first and second arrays and for providing a scanning synchronization signal;
light responsive detecting means positioned with respect to said second support for deriving an electrical data signal corresponding with the light intensity of said interference pattern at a said sampled matrix location;
means for conveying said scanning synchronization signals and said data signals;
third and fourth transparent supports spaced a predetermined distance apart, said third support having a surface positionable for receiving light from a coherent source exhibiting said predetermined wavelength characteristics;
a third array of parallel, electrically conductive electrodes supported in a third predetermined orientation by said third support;
a fourth array of parallel, electrically conductive electrodes supported in a fourth predetermined orientation by said fourth transparent support to define with said third array of electrodes a second matrix of spaced electrode crossing locations geometrically corresponding with said first matrix;
a second normally opaque medium intermediate said third and fourth supports, having a suspension of dipolar particles normally randomly dispersed therein, said particles being movable into alignment with an applied electrical field of at least threshold field strength value to effect a transmissive condition of said medium;
a third electrically conductive layer supported adjacent said third support and having openings therein aligned with said electrode crossing locations;
a fourth electrically conductive layer supported adjacent said fourth support, having openings therein aligned with said electrode crossing locations and being in electrically conductive communication with said third electrically conductive layer;
a first transparent, electrically conductive latching electrode adjacent said third support;
a second transparent, electrically conductive latching electrode adjacent said fourth support; and
second control means electrically coupled with said third and fourth electrode arrays and said first and second latching electrodes, responsive to said conveyed scanning synchronization signals and said data signals for generating an electrical field of value above said threshold field strength value and corresponding with said data signals between electrodes of said third and fourth arrays at said crossing locations in a sequence regulated by said synchronizing signals and for generating a latching electric field intermediate said first and second latching electrodes having field strength value selected below said threshold value for effecting a retention of a pre-existing said particle alignment.

30. The system of claim 29 in which said first control means includes:

first register means for applying a first matrix position component of first sampling signals simultaneously to each said electrode of said first array thereof; and first sequential line circuit means for applying a second matrix position component of said first sampling signals to a select said electrode of said second array thereof simultaneously with said application of said first component.

31. The system of claim 30 in which said second control means includes:

second register means for applying a first matrix position component of second sampling signals in conjunction with said data signals simultaneously to each said electrode of said third array thereof;

second sequential circuit means for applying a second matrix component of said second sampling signals to a select said electrode of said fourth array thereof in conjunction with said data signals simultaneously with said application of said second matrix composed of said second sampling signals; and synchronizing means responsive to said scanning synchronization signal for synchronizing said second register means and said second sequential line circuit means applications with respective said first register means and first sequential line circuit means applications.

32. The system of claim 30 in which said light responsive detecting means comprises a third array of photo-responsive components positioned adjacent said second array of parallel, electrically conductive electrodes, each said component being substantially aligned with a select said first array electrode and having an output for providing a said electrical data signal.

33. The system of claim 30 in which said light responsive detecting means comprises:

an electrically conductive biasing layer supported from said second support;

an array of photo-conductive discrete strips positioned in conducting relationship upon said biasing layer, each said strip being aligned and coextensive with a select said electrode of said first array thereof; and an array of transparent, electrically conductive strips, each said strip thereof being positioned in a conducting relationship with a select said photoconductive strip and being electrically isolated from said biasing layer; and means for establishing a predetermined potential between said biasing layer and each said photo-conductive strip whereby each said strip provides a said electrical data signal.

* * * * *